Oct. 31, 1939.  J. KNUDSON ET AL  2,177,941
AUTOMATIC LUMBER LOADER AND LIFT
Filed Oct. 6, 1938  2 Sheets-Sheet 1
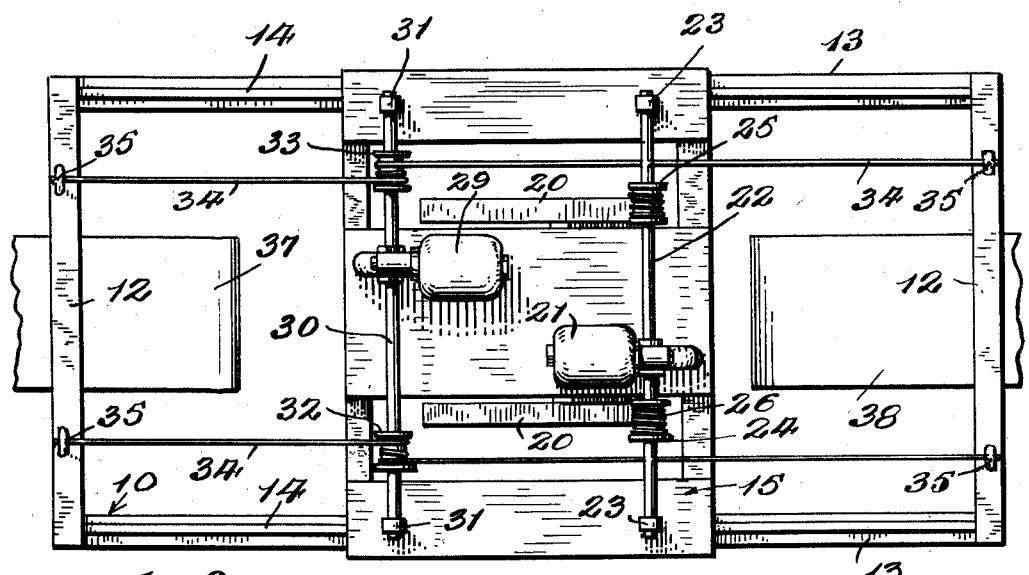
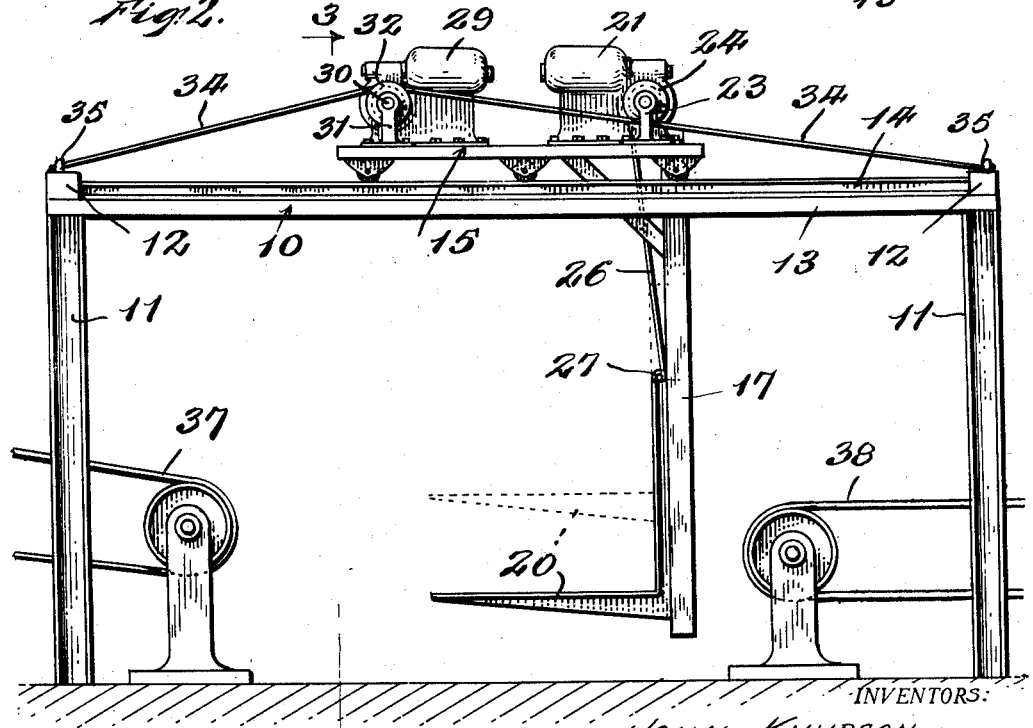
INVENTORS:
JOHN KNUDSON,
WALTER NEILS,
BY Christian L. Nielsen
ATTORNEY.

Oct. 31, 1939.  J. KNUDSON ET AL  2,177,941
AUTOMATIC LUMBER LOADER AND LIFT
Filed Oct. 6, 1938  2 Sheets-Sheet 2

INVENTORS:
and: JOHN KNUDSON,
WALTER NEILS,
BY: Christian R. Nielsen
ATTORNEY

Patented Oct. 31, 1939

2,177,941

UNITED STATES PATENT OFFICE 2,177,941

AUTOMATIC LUMBER LOADER AND LIFT

John Knudson and Walter Neils, Libby, Mont.

Application October 6, 1938, Serial No. 233,656

1 Claim. (Cl. 212—27)

This invention relates to an automatic lumber loader and lift, particularly adaptable to use in connection with lumber trimming machines, and it consists in the constructions, arrangements and combinations herein described and claimed.

It is a cardinal purpose of the invention to provide a traveling loader and elevating means so constructed as to move between a conveyor from a trimming machine and a loader conveyor, thereby facilitating the handling of trimmed lumber without manual labor.

It is also an object of the invention to provide automatic means for raising and lowering the lumber support means as well as providing automatic means for moving the support into position around the conveyor from the trimming machine and the loading conveyor.

Additional objects, advantages and features of invention will be apparent from the following description considered in conjunction with the accompanying drawings, wherein Figure 1 is a side elevation of the device showing its relation to the trimmer and loader conveyors.

Figure 2 is a top plan view thereof.

Figure 3:
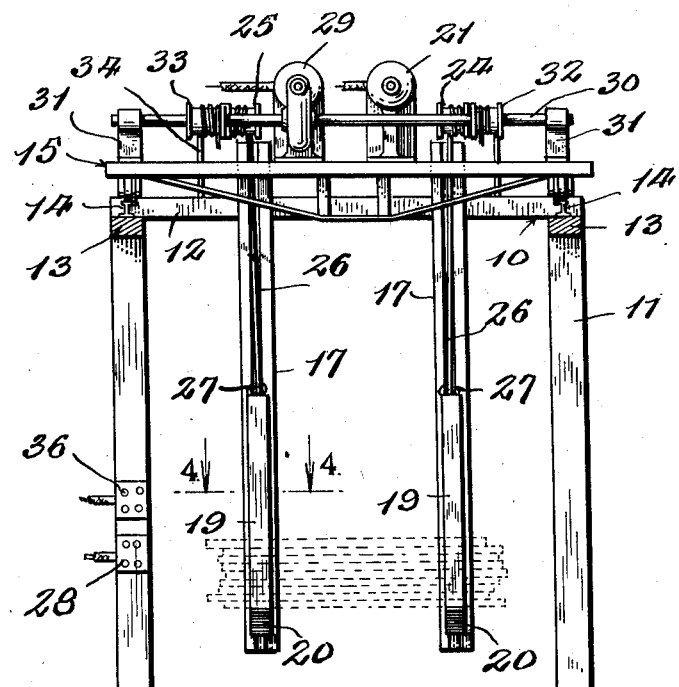
Figure 3 is a cross section on the line 3—3 of Figure 1.

There is illustrated a frame structure 10 consisting of uprights 11, end sills 12, and side sills 13 and since the loads to be transported from one conveyor to the other will be quite heavy, the frame should be substantially built.

The side sills 13 have mounted upon their upper faces a track rail 14 extending from one end sill 12 to the other, the track thus provided supporting a platform 15. The platform has flanged wheels 16 complemental to the rails for movement therealong, as will be understood as the description proceeds.

Figure 4:
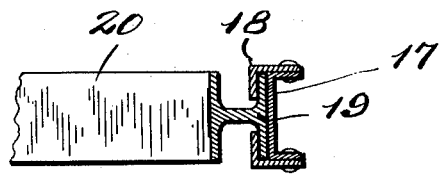
Figure 4 is a cross section on the line 4—4 of Figure 3.

The platform 15 has a pair of downwardly extended supports 17 and as may be seen in Figure 4, are formed of channel beams upon the flanges of which L-shaped beams 18 are secured, the flange of the beams 18 being spaced from the channel beam a distance forming a guide for a flange 19 of a load support foot 20.

The supports 17 are spaced so that upon movement of the platform along the tracks 14, a support will be positioned upon the sides of the conveyors, the feet 20 thus being in position to receive lumber from the trimming machine or to deposit lumber upon the loader conveyor. The load supports, it will be seen, are vertically slidable within the guides of the supports 17, and in order that the load supports may be power actuated, an electric motor 21 is mounted upon the platform 15, in operative engagement with a transverse shaft 22, suitably journalled in bearings 23 upon the platform. The shaft 22 has fixed thereon a pair of drums 24 and 25, one for each load support foot 20, and about each of the drums 24—25 there is wound a cable 26, one end being secured to the drums and the other end being fixed to the upper end of the flange 19 of the support foot, as indicated at 27. The motor 21 will be of a reversible type controlled through a switch generally indicated at 28, and it will be apparent that rotation of the motor in one direction will cause raising of the load support feet, while in the opposite direction of rotation the supports will be lowered.

Locomotion of the platform 15 is required in order that it may be moved along the tracks 14 and in the present instance, we provide an electric motor 29 mounted on the platform, suitably geared to a transverse shaft 30 revolubly mounted in bearings 31. A pair of drums 32 and 33 are keyed to the shaft 30, and about each drum a cable 34 is wound. The cables are wound upon the drums intermediate their lengths, respective ends of the cables being securely anchored to the end sills 12 of the frame structure, as indicated at 35. The cables 34 are maintained taut and frictionally bind upon the drums so that with rotation of the shaft and drums, in either direction, the carriage will be drawn along the track, the direction of movement of the carriage being determined, of course, by the direction of rotation of the motor, the latter also being of a reversible type and controlled through a suitable switch 36.

The operation will be readily understood from the following description.

The conveyor from the trimming machine is indicated at 37, and the loader conveyor is shown at 38 and it is desired to transfer lumber from the conveyor 37 to the conveyor 38. The switch 36 is actuated to cause counter-clockwise rotation of the shaft 30 by virtue of the motor 29, causing a winding of the cables 34 in a direction to draw the carriage or platform in the direction of the conveyor 37. When the carriage 15 has moved the foot members into proper position about the conveyor 37 the motor 29 is stopped. The motor 21 is now energized through control switch 28 so that the shaft 22 is rotated in a clockwise direction, causing a winding of the cables 26 upon the drums, drawing the foot members 20 upwardly to a position to receive lumber from the conveyor 37. As the lumber is stacked upon the foot members 20, it will be necessary to lower the foot members from time to time until the required number of boards have been deposited and this lowering movement may be effected by reverse rotation of the shaft 22. When the boards have been stacked on the foot members 20 and it is desired to deposit them on the conveyor 38, the motor 29 is energized to move the carriage in the direction of the conveyor, the motor 21 also being energized to raise the foot members 20 to a position above the conveyor 38 so that the boards thereon will clear the conveyor. Movement of the carriage is continued until the boards are immediately above the belt of the conveyor, when the motor 21 is energized to lower the foot members and deposit the boards upon the conveyor. When the boards have been deposited upon the conveyor 38, the foot members 20 are allowed to lower slightly further so as to clear the boards, when the motor 29 through cables 34 move the platform 15 in such direction that the foot members 20 clear the stacked lumber. The carriage 15 and associated mechanism is then returned to position for receiving further boards from the conveyor 37 and the operation described is repeated.

While we have shown and described a preferred form of the device, this is by way of illustration only, and we consider as our own all such modifications in structure as fairly fall within the scope of the appended claim.

We claim:

An automatic lumber loader and lift comprising an elevated frame work, track rails extended longitudinally of the frame work, a carriage movably supported upon the rails, a pair of vertically disposed guide beams suspended from the frame work, each beam having a channel vertically thereof, a lumber supporting foot slidably connected with each channel, cable means connected to each foot, a transverse shaft on the framework, a pair of drums on the shaft, said drums having respective cables of the foot members wound thereon, power means on the carriage for rotating the shaft in either direction, a second transverse shaft on the carriage, drum members fixed thereon, power means on the carriage for rotating the shaft in either direction, and a second cable wound about said drums for frictional grip thereon, the ends of said second cable being anchored to respective ends of the frame-work.

JOHN KNUDSON.
WALTER NEILS.